UNITED STATES PATENT OFFICE.

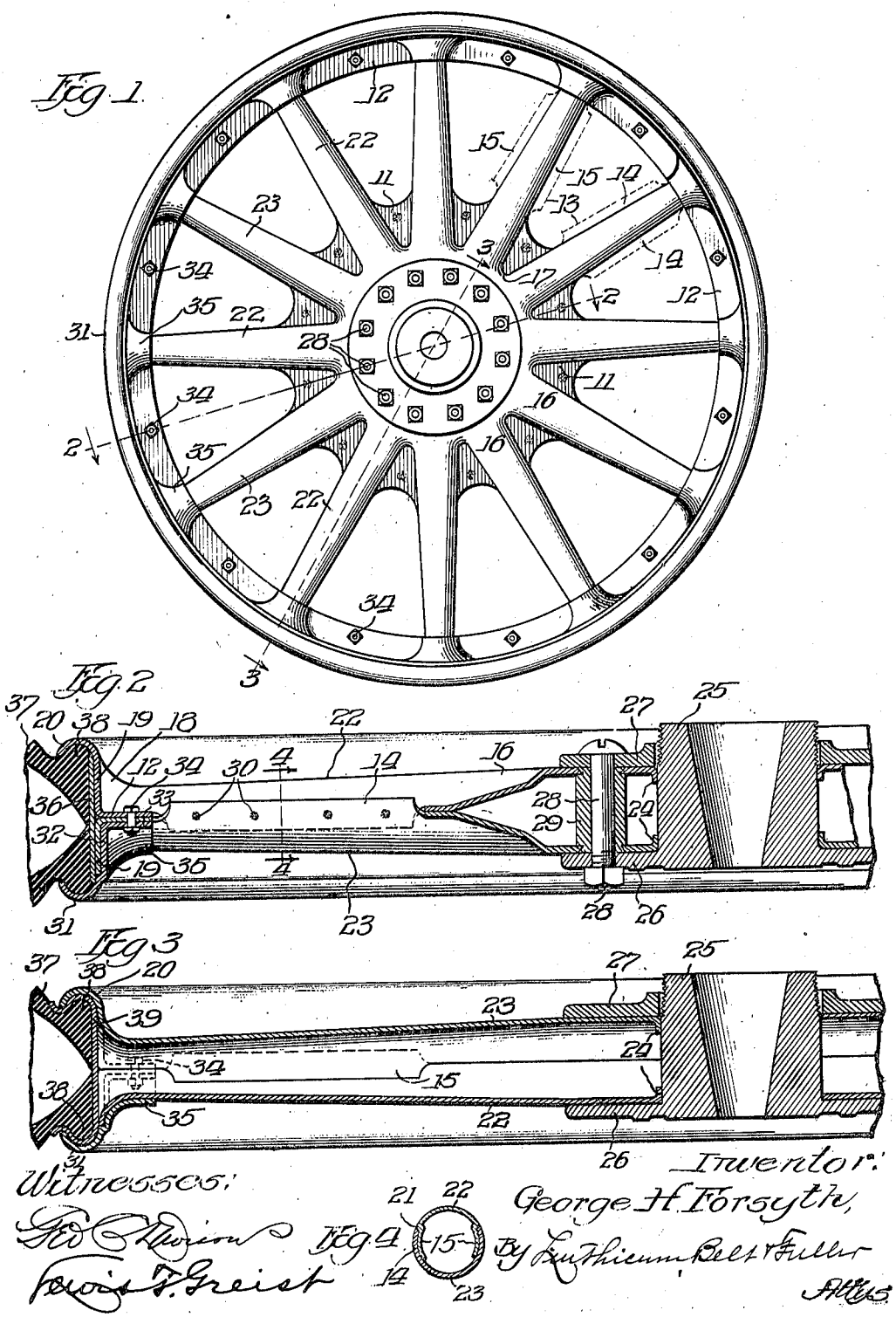

GEORGE H. FORSYTH, OF CHICAGO, ILLINOIS, ASSIGNOR TO FORSYTH BROTHERS COMPANY, OF CHICAGO, ILLINOIS, A CORPORATION OF ILLINOIS.

VEHICLE-WHEEL.

1,269,172.  Specification of Letters Patent.  Patented June 11, 1918.

Application filed January 21, 1914. Serial No. 813,476.

*To all whom it may concern:*

Be it known that I, GEORGE H. FORSYTH, a citizen of the United States, residing at Chicago, in the county of Cook and State of Illinois, have invented certain new and useful Improvements in Vehicle-Wheels, of which the following is a specification.

The invention relates to pressed metal wheels and particularly of that general type wherein two similar halves each comprising central hub and radial spoke and peripheral rim portions are placed side by side in opposition with the spoke members of one half overlapping to a greater or less extent the corresponding spoke members of the other half, and the halves then secured together to form a complete wheel.

The object of the invention is to provide a pressed metal wheel of improved construction which shall possess the highest degree of strength and resistance to strains and shocks applied either in the plane of the wheel or at an angle thereto and which shall at the same time embody simplicity of manufacture and economy of metal employed with a consequent low cost of production.

The wheel is particularly adapted for use in connection with the construction of motor vehicles and for such purposes is preferably made of pressed steel although obviously it could be advantageously used in other connections where metal other than steel would be found suitable.

Among the important features of the invention are the uniting of the spoke halves in such manner as to strengthen the spokes against lateral stresses; the provision of overlapping fillets at the points of emergence of the spoke members from the central hub portion and also their points of merger with the felly or rim whereby disadvantageous weakening of the metal at these points is avoided; also the adaptation of a sheet metal wheel to detachable and demountable tires and rims by the provision of a removable rim portion supported not only by the felly, but by fillet engagement with the spokes.

Other details of improved construction which will hereafter be made manifest constitute of the improved wheel a decided advance in this art from the standpoint of strength, neatness and low cost of manufacture.

In order that the invention may be readily understood a preferred embodiment of the same is set forth in the accompanying drawing and in the following detailed description based thereon. As, however, the invention is susceptible of embodiment in other and varied constructional forms the drawing and description are to be construed in an illustrative sense and not as unnecessarily limiting the invention. In the drawing:

Figure 1 is a side elevation of a wheel constructed according to the invention;

Fig. 2 is an enlarged sectional view taken on the line 2—2 of Fig. 1;

Fig. 3 is a similar view taken on the line 3—3 of Fig. 1; and

Fig. 4 is a transverse section taken on the line 4—4 of Fig. 2.

The wheel as illustrated is manufactured by punching and pressing from two circular blanks of sheet metal, the blanks being punched to provide a central disk portion 11 with integral strips extending radially therefrom, these strips being connected at their outer ends by a peripheral web 12. The radial strips are left integral with the central disk and the peripheral web along their medial portion only, the punching operation blanking out the portion between adjacent strips along the dotted lines indicated at 13 in Fig. 1, so as to leave marginal portions 14, 15, extending as wings along each side of the adjacent strips.

By a pressing operation the disk portion 11 is outwardly dished and also provided with radiating semi-tubular ribs or channels 16 which extend from the central portion of the disk radially and the semi-tubular formation of which continues along the medial line of the strips and including the web. The inner ends of the semi-tubular ribs are slightly flared so as to merge each with the adjacent rib, as indicated at 17, while the outer ends of the semi-tubular medial portion of the strips are similarly flared to merge along a curved line with the web, as indicated at 18. The laterally extending wings forming the marginal portions of the strips are further bent to form a substantial continuation of the semi-tubular medial portion and thus constitute of the strips spoke members of a modified U-cross section.

The two blanks from which the two wheel halves are formed may be exact duplicates, but preferably one of the disks is slightly larger than the other so that when by an appropriate pressing operation the outer portion of the web 12 is bent laterally at right angles to form the tire supporting portion of the rim, as indicated at 19, an integral inwardly turned tire-retaining flange 20 may be formed on said wheel half, while the rim portion of the other half terminates short of such flange, as clearly shown in Fig. 2, for a purpose to be hereafter made clear. The inner portion of the web 12 remains as a medial reinforcing flange for the rim and as a convenient means of attachment for a removable tire-retaining flange.

In the pressing operation by which the U-shaped spoke members are formed, the lateral wings 14 of one set of spokes are so bent as to form an exact continuation of the curvature of the medial portion, while the wings 15 of the other set of spokes are slightly offset inwardly the thickness of the metal, as clearly shown in Fig. 4, so as to present an outer shoulder 21 whereby when the two halves of the wheel are placed together side by side the inwardly offset wings of one spoke member will be embraced within the wings of the corresponding spoke member of the other half, which wings are not offset, while the edges of the latter will abut against the shoulders 21 thus insuring a snug fit and forming a completed spoke, the members 22 and 23 of which possess an outer surface which is substantially unbroken.

The two disks having been provided each with a central aperture the marginal portions thereof are inwardly flanged at 24 so as to bear against the hub proper 25 when the latter is inserted within such central aperture, with the hub face plate 26 overlying one of the disks, and the removable face plate 27 overlying the other. Bolts 28 are arranged at intervals about the hub and serve to secure the hub portions of the disks together by clamping the same between the face plates. Spacing spools 29 having upset shoulder portions are traversed by the bolts and thus prevent collapsing of the hub portion of the wheel. The overlapping marginal portions 14 and 15 of the spokes are permanently secured together and advantageously by spot welding, as indicated at 30. The web portions 12 constituting the felly of the wheel are also permanently secured together as by spot welding.

By the provision of an integral tire-retaining flange 20 upon one side only of the wheel, as previously described, the wheel is adapted for detachable tires or demountable rims. To this end the removable tire-retaining flange member is provided, which is likewise pressed from sheet metal and comprises the tire-retaining flange 31, formed upon the rim section 32, which is flanged at right angles at 33 to fit against the side face of the felly 12 upon that side of the wheel opposite the flange 20. The portion 33 of the removable flange member is secured to the felly 12 by means of bolts 34 arranged intermediate the spokes and at points corresponding to the spokes is outwardly curved to half envelop the outer end of the spoke and form a snug engagement therewith, as indicated at 35. Along the line of junction between the flange 31 and the rim section 32 the removable flange member is offset, as clearly shown in Figs. 2 and 3, so as to form an abutment against the outer edge of the rim portion 19.

To adapt the wheel for use in connection with a detachable tire, as illustrated in Fig. 2, an annular band 36 is slipped upon the rim portion 19 and the tire 37 is placed in position with one of its beads 38 underlying the integral flange 20. The removable flange member is then slipped into position with its tire-retaining flange 31 engaging the other bead 38 of the tire and the bolts 34 are secured in place. The adaptation of the wheel to a demountable rim, as illustrated in Fig. 3, is substantially the same as that just described except that the annular band 36 is replaced by the demountable rim 39 with which the tire 37 has been previously assembled. In both cases the support of the removable rim section by the side of the felly, by the inner face of the rim, and by its enveloping engagement with the spoke insures sufficient rigidity which is not otherwise possible with a sheet metal construction.

A partial enveloping of one spoke member by another in the manner described as forming a part of the present invention, provides a completed spoke which has double walls oppositely disposed in the medial plane of the wheel so that the spokes of the wheel are reinforced against lateral stresses and the wheel is materially strengthened at the point which is otherwise the weakest. By the provision of fillets at the points of emergence of the spokes from the central hub portion and at their points of merger with the rim portion abrupt angles are avoided and the liability of the metal to tear at these points is safe-guarded against. Moreover, the overlapping of these fillets, as clearly shown in Figs. 2 and 3, provides for a close fit therebetween and thus prevents the entrance of moisture through openings which would otherwise be difficult to avoid.

While the inwardly offset marginal portion 15 may be provided uniformly on one half of the wheel, I find it advantageous to so offset the marginal portions of the spoke members alternately upon each half that the same die may be used for pressing both halves and by having the inner portions disposed in alternation upon successive spokes the wheel is absolutely symmetrical and its resistance to stresses from either side is uniform.

I claim:

1. A pressed metal wheel comprising integral rim and spoke portions, the rim having an integral tire-retaining flange on one side thereof and a removable tire-retaining flange detachably secured to the rim upon the other side thereof, substantially as described.

2. A pressed metal wheel comprising integral rim and spoke portions, the rim having an integral tire-retaining flange on one side thereof and a removal tire-retaining flange detachably secured to the rim upon the other side thereof, said removable tire-retaining flange having portions half enveloping the outer ends of the spokes, substantially as described.

3. A pressed metal wheel comprising similar halves each including integral rim, hub and spoke portions, one of the rim portions having an integral tire-retaining flange and a removable tire-retaining flange detachably secured to the other rim portion, substantially as described.

4. A pressed metal wheel comprising similar halves each including integral rim, hub and spoke portions, one of the rim portions having an integral tire-retaining flange and a removable tire-retaining flange detachably secured to the other rim portion, said removable tire-retaining flange having channeled portions half enveloping the outer ends of the spokes, substantially as described.

In testimony whereof I have hereunto signed my name in the presence of two subscribing witnesses.

GEORGE H. FORSYTH.

Witnesses:
  LEWIS T. GREIST,
  T. D. BUTLER.